US012456004B2

(12) United States Patent  
Baughman et al.

(10) Patent No.: US 12,456,004 B2
(45) Date of Patent: Oct. 28, 2025

(54) CONTEXTUAL AND PERSONALIZED REAL TIME CONTENT MODIFICATION FOR LANGUAGE ASSISTANCE

(71) Applicant: International Business Machines Corporation, Armonk, NY (US)

(72) Inventors: Aaron K. Baughman, Cary, NC (US); Shikhar Kwatra, San Jose, CA (US); Gray Franklin Cannon, Atlanta, GA (US); Raghuveer Prasad Nagar, Kota (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 785 days.

(21) Appl. No.: 17/569,106

(22) Filed: Jan. 5, 2022

(65) Prior Publication Data

US 2023/0214580 A1     Jul. 6, 2023

(51) Int. Cl.
*G06F 40/166* (2020.01)
*G06F 40/263* (2020.01)
*G06F 40/40* (2020.01)

(52) U.S. Cl.
CPC .......... *G06F 40/166* (2020.01); *G06F 40/263* (2020.01); *G06F 40/40* (2020.01)

(58) Field of Classification Search
CPC ...... G06F 40/166; G06F 40/263; G06F 40/40; G06F 40/58; G10L 15/005
USPC .......................................................... 704/8
See application file for complete search history.

(56) References Cited

U.S. PATENT DOCUMENTS

| | | | |
|---|---|---|---|
| 6,341,372 B1 | 1/2002 | Datig | |
| 6,816,468 B1 | 11/2004 | Cruickshank | |
| 6,820,055 B2 | 11/2004 | Saindon et al. | |
| 7,315,809 B2 | 1/2008 | Xun | |
| 7,664,629 B2 | 2/2010 | Dymetman et al. | |
| 8,279,861 B2 | 10/2012 | Chao-Suren et al. | |
| 9,411,793 B2 | 8/2016 | Travieso et al. | |
| 9,910,850 B2 | 3/2018 | Sakashita et al. | |
| 10,248,653 B2 | 4/2019 | Blassin et al. | |

(Continued)

FOREIGN PATENT DOCUMENTS

EP     0233996 B1     1/1996

OTHER PUBLICATIONS

Research Gate, How can I detect multiple languages of a sentence?, Oct. 26, 2015, https://www.researchgate.net/post/How_can_I_detect_multiple_languages_of_a_sentence.

*Primary Examiner* — Thierry L Pham
(74) *Attorney, Agent, or Firm* — Garg Law Firm, PLLC; Rakesh Garg; Michael O'Keefe

(57) ABSTRACT

By analyzing a natural language content concurrently with a presentation of the natural language content, a first language of the natural language content is detected. By analyzing the natural language content concurrently with the presentation of the natural language content, it is detected that a subset of the natural language content is expressed in a second language, wherein the second language is different from the first language, wherein a set of known languages comprises the first language, wherein the set of known languages excludes the second language. From the subset of the natural language content, a modified subset expressed in the first language is generated. The modified subset is inserted into the natural language content.

20 Claims, 9 Drawing Sheets

(56) References Cited

U.S. PATENT DOCUMENTS

| | | |
|---|---|---|
| 10,565,320 B1 | 2/2020 | Liu et al. |
| 10,991,370 B2 | 4/2021 | Ponniah et al. |
| 11,049,501 B2 | 6/2021 | Arar et al. |
| 2002/0169592 A1 | 11/2002 | Aityan |
| 2017/0353770 A1 | 12/2017 | Jiang et al. |
| 2018/0089172 A1 | 3/2018 | Needham |
| 2020/0074515 A1* | 3/2020 | Ghatage ................. G06F 40/58 |

* cited by examiner

CONTEXTUAL AND PERSONALIZED REAL TIME CONTENT MODIFICATION FOR LANGUAGE ASSISTANCE

BACKGROUND

The present invention relates generally to a method, system, and computer program product for content modification. More particularly, the present invention relates to a method, system, and computer program product for contextual and personalized real time content modification for language assistance.

Content includes audio, video, or a combination of audio and video, viewed on any suitable device. Closed captioning and subtitling are both processes of displaying text within audio-video content to provide additional or interpretive information, such as a written form or a translation of the content's audio. Dubbing is the act or process of replacing audio within audio-video content with different audio, or adding music, sound effects, and other audio to existing audio-video content. Subtitles are often used to provide a written translation of spoken-word portions of content. Dubbing is often used to replace audio in one language with corresponding audio in another language.

SUMMARY

The illustrative embodiments provide a method, system, and computer program product. An embodiment includes a method that detects by analyzing a natural language content concurrently with a presentation of the natural language content, a first language of the natural language content. An embodiment detects, by analyzing the natural language content concurrently with the presentation of the natural language content, that a subset of the natural language content is expressed in a second language, wherein the second language is different from the first language, wherein a set of known languages comprises the first language, wherein the set of known languages excludes the second language. An embodiment generates, from the subset of the natural language content, a modified subset, the modified subset expressed in the first language. An embodiment inserts, into the natural language content, the modified subset, the inserting resulting in a second natural language content.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
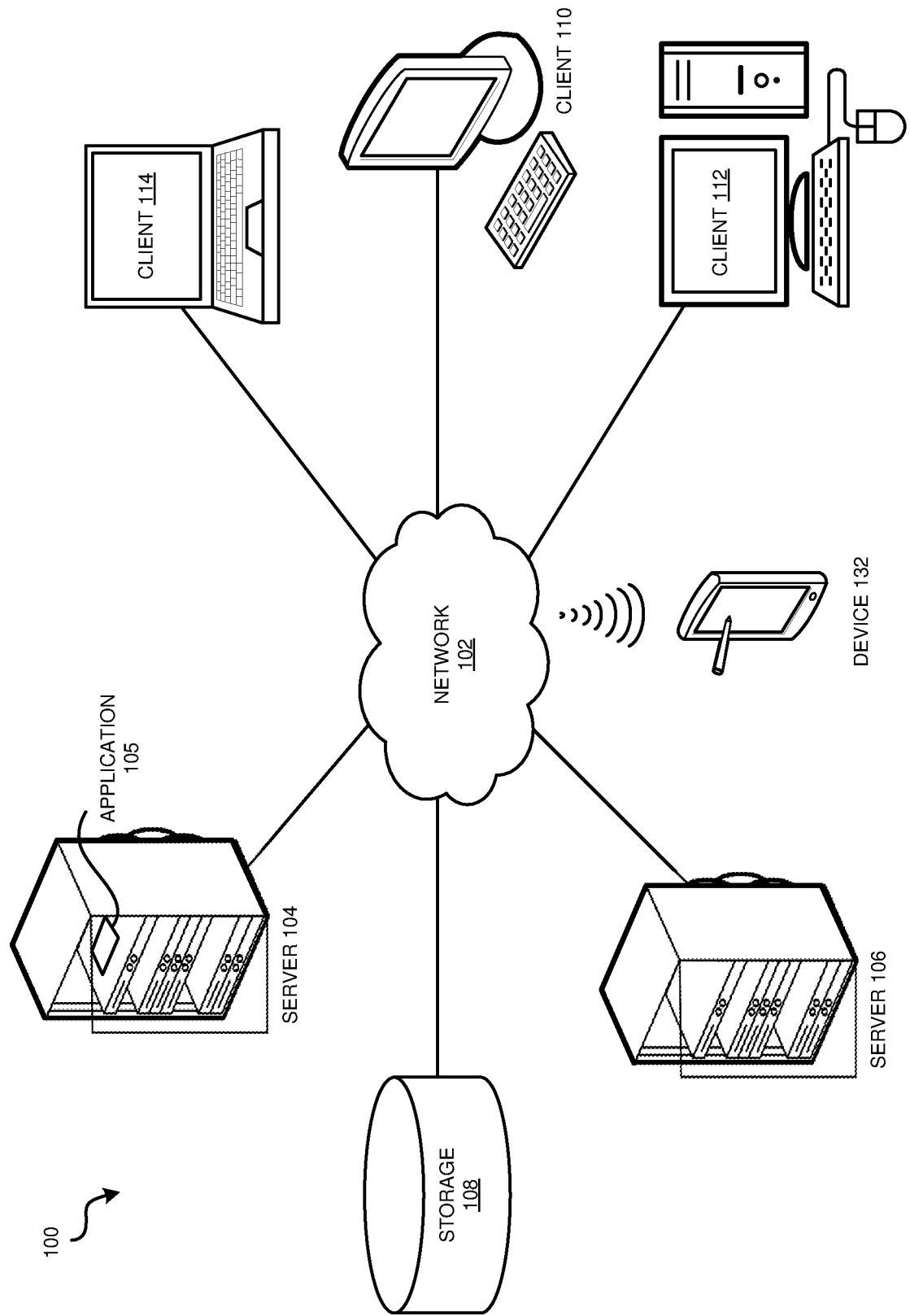
FIG. 1 depicts a block diagram of a network of data processing systems in which illustrative embodiments may be implemented.

The illustrative embodiments recognize that content, while mainly in one language, often includes one or more portions in another language. For example, in a presentation of Japanese cooking, a presenter might explain a cooking technique in English, but use Japanese words for some ingredients. As another example, in a movie, two characters, both bilingual in English and French, might communicate in a mixture of the two languages. However, a viewer of the content may not be familiar with the second language, resulting in confusion and inconvenience, or even the viewer ceasing to watch the content. For example, a viewer encountering an unknown language might pause the content to search for a translation. However, searching for a translation is difficult if the viewer is uncertain as to the spelling of a word or phrase in an unknown language. As well, a content creator may be unaware that a word or other content portion is in another language. For example, slang terms are often borrowed unknowingly from another language, and multilingual people often intermingle words from one of their languages into their speech in another language. Further, although subtitling and dubbing can be implemented to translate portions of content, if the content is being provided in real time, a closed captioning or dubbing implementation is unlikely to be ready for a new language and be able to provide an effective translation. All of these factors worsen a user's content viewing experience. Thus, the illustrative embodiments recognize that there is an unmet need to, within content in a first language, detect content in a second language that is unfamiliar to a viewer of the content, and modify the content to provide an explanation or translation in real time.

The illustrative embodiments recognize that the presently available tools or solutions do not address these needs or provide adequate solutions for these needs. The illustrative embodiments used to describe the invention generally address and solve the above-described problems and other problems related to contextual and personalized real time content modification for language assistance.

An embodiment can be implemented as a software application. The application implementing an embodiment can be configured as a modification of an existing content delivery system, as a separate application that operates in conjunction with an existing content delivery system, a standalone application, or some combination thereof.

Particularly, some illustrative embodiments provide a method that determines, by analyzing a natural language content, a first, known language of the natural language content and that a subset of the natural language content is expressed in a second, unknown language different from the first language. The method generates, from the subset of the natural language content, a modified subset expressed in the first language wherein a set of known languages comprises the first language, and inserts, into the natural language content, the modified subset.

An embodiment learns content language preferences of a user of the embodiment. A user's content language preferences are languages in which the user is able to, or prefers to, consume content. For example, one user might be fluent in English and prefer content in English. This user is also in the process of learning French, so might also consume some content in French, perhaps with English subtitles. However, while this user speaks a few words of other languages, she does not wish to consume content in any other languages.

In one embodiment, a user supplies explicit content language preferences via a user interface. Another embodiment determines content language preferences of a user by analyzing content the user consumes. For example, if a user only consumes content in English, the embodiment infers that the user prefers content in English and not content in other languages. Another embodiment determines content language preferences of a user by using an Internet of Things (IoT) device, a device including a processor on which an application executes, memory, one or more sensors such as a microphone, and an ability to communicate over a network, to analyze results from monitoring a user's environment on an opt-in basis. For example, a user might interact with an IoT device executing a voice-activated audio player application in French, and thus the embodiment infers that the user prefers content in French. Another embodiment determines content language preferences of a user by analyzing one or more of the user's textual messages, social media postings, inputs to websites, and other interactions with applications. One presently available technique for determining a language of written or spoken content is to use metadata explicitly describing the content's language. Another presently available technique for determining a language of written or spoken content is to use speech-to-text conversion (if necessary) and natural language processing on the resulting text to match words within content to a known language. Other techniques to determine a language of written or spoken content and user input are also presently available.

An embodiment uses a presently available technique to analyze a content a user is currently consuming and detect a first language of the content. The content may be live or prerecorded.

An embodiment detects one or more users of the current content. In one embodiment, a user notifies the embodiment that he or she is viewing the content, for example by logging into a user account with the embodiment. Another embodiment infers a presence of a user in a viewing location of the content. For example, some network-connected televisions include a subsystem capable of detecting the presence of a viewer in the vicinity of the television. As another example, a user might be concurrently interacting with a smart speaker device known to be installed in the vicinity of the user's viewing device. As a third example, a user might be consuming content on a device the user typically carries on her person, such as a smart\phone.

An embodiment determines a set of known languages for one or more detected users of the current content. One embodiment includes, in the set of known languages, any language of at least one detected user. For example, if there are two users present, and one prefers content in English while the other prefers content in English and French, the embodiment includes both English and French in the set of known languages. Another embodiment includes, in the set of known languages, any language common to all detected users. Thus, for the same two example users, this embodiment includes only English in the set of known languages.

An embodiment determines a set of unknown languages for one or more detected users of the current content, by removing the set of known languages from a set of languages the embodiment is able to process. For example, if an embodiment is able to process content in Japanese, Hindi, French, Spanish, and English, and the set of known languages contains English and French, the set of unknown languages is Japanese, Hindi, and Spanish.

An embodiment continues to use a presently available technique to analyze the content a user is currently consuming, detects that a subset or portion of the current content is in a different language from the first language of the content, and identifies the different language. An embodiment also determines whether the different language is in the set of known languages or the set of unknown languages. For example, consider a situation in which an original content is primarily in English, but a presenter used the sentence, "You can get more milk at any depanneur." An embodiment recognizes that, in this sentence, depanneur is a French word, and that French is in the set of unknown languages for the content's current user or users. If the different language is in the set of known languages, the embodiment continues to analyze the content for a later language change.

If the different language is in the set of unknown languages, an embodiment generates a modified subset from the original subset of content. The modified subset is expressed in the first language, not the different language. In one embodiment, the modified subset is replacement content for the original subset. Some non-limiting examples of replacement content are replacing a word within a sentence with a synonym in the first language while keeping the sentence grammar intact, replacing a multi-word phrase within a sentence with a translated phrase in the first language while keeping the sentence grammar intact, and replacing a sentence with a translated sentence in the first language. Thus, continuing the example, because a depanneur is a French term for a convenience store or corner store, an embodiment generates replacement content—convenience store. In another embodiment, the modified subset is support content for the original subset. Support content is content that is added to the original content. Some non-limiting examples of support content are a subtitle translating the original content to the first language, text explaining the original content in the first language, and an audio explanation, provided via the same or a different audio channel as the original content. Thus, continuing the example, an embodiment generates support content—text explaining, in English, that a depanneur is a French term for a convenience store or corner store. Another embodiment generates replacement content or support content, depending on a user's preference. One embodiment receives a user's preference explicitly, via a user interface. Another embodiment infers a user's preference, in a manner described herein, from other content generated by the user. For example, the user might have posted a social media message indicating a preference for one type of modified content over another.

To generate a modified subset of content from the original subset of content, one embodiment uses an internal translation database matching words and phrases in one language with corresponding words and phrases in another language. Another embodiment searches, in real-time, a network such as the Internet for a translation or explanation of the original subset of content using a presently available cognitive tool. A cognitive tool is an application that performs natural language processing (NLP), which involves syntax and semantics driven text analysis and synthesis. An embodiment evaluates a search result using a modified form of a presently known technique to search a corpus for content matching the original subset but in the desired language. An embodiment uses one or more quality measures to evaluate a result of the search. Some non-limiting examples of presently known quality measures used to evaluate a search result are: information in a sentence that covers the search query, how much mass a summary devotes to the query, how well a summary covers a document set, a measure of summary diversity, a position of a sentence within a larger document (to bias sentences that occur earlier in a document), and a sentence length (to bias sentences towards longer length). An embodiment adds two additional quality measures: a language quality measure, measuring the proportion of a language (using the words of the language) within a sentence that is in multiple languages, and a user frustration based quality measure, measuring a user's frustration level with the content. An embodiment also uses a presently available technique to convert text to audio, if the modified content is to be presented in audio form.

An embodiment inserts the modified subset of content into the original content, in near real time, while the user is viewing the content. The term near real-time refers to a time delay introduced between receipt and display of a stream of content, using buffering to accommodate processing of the content without having to wait for an entire large content file to download. If the modified subset of content is replacement content, an embodiment replaces the original subset of content, in the unknown language, with replacement content. Thus, continuing the example, an embodiment modifies the content, changing the original sentence to "You can get more milk at any convenience store." If the modified subset of content is support content, an embodiment provides the support content along with the original content. Thus, continuing the example, an embodiment modifies the content by displaying text (e.g. in a box in a corner of the content) explaining, in English, that a depanneur is a French term for a convenience store or corner store along with the original content.

The manner of contextual and personalized real time content modification for language assistance described herein is unavailable in the presently available methods in the technological field of endeavor pertaining to content delivery via a network. A method of an embodiment described herein, when implemented to execute on a device or data processing system, comprises substantial advancement of the functionality of that device or data processing system in determining, by analyzing a natural language content, a first, known language of the natural language content and that a subset of the natural language content is expressed in a second, unknown language different from the first language. The method generates, from the subset of the natural language content, a modified subset expressed in the first language wherein a set of known languages comprises the first language, and inserts, into the natural language content, the modified subset.

The illustrative embodiments are described with respect to certain types of contents, replacement contents, support contents, languages, delays, thresholds, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
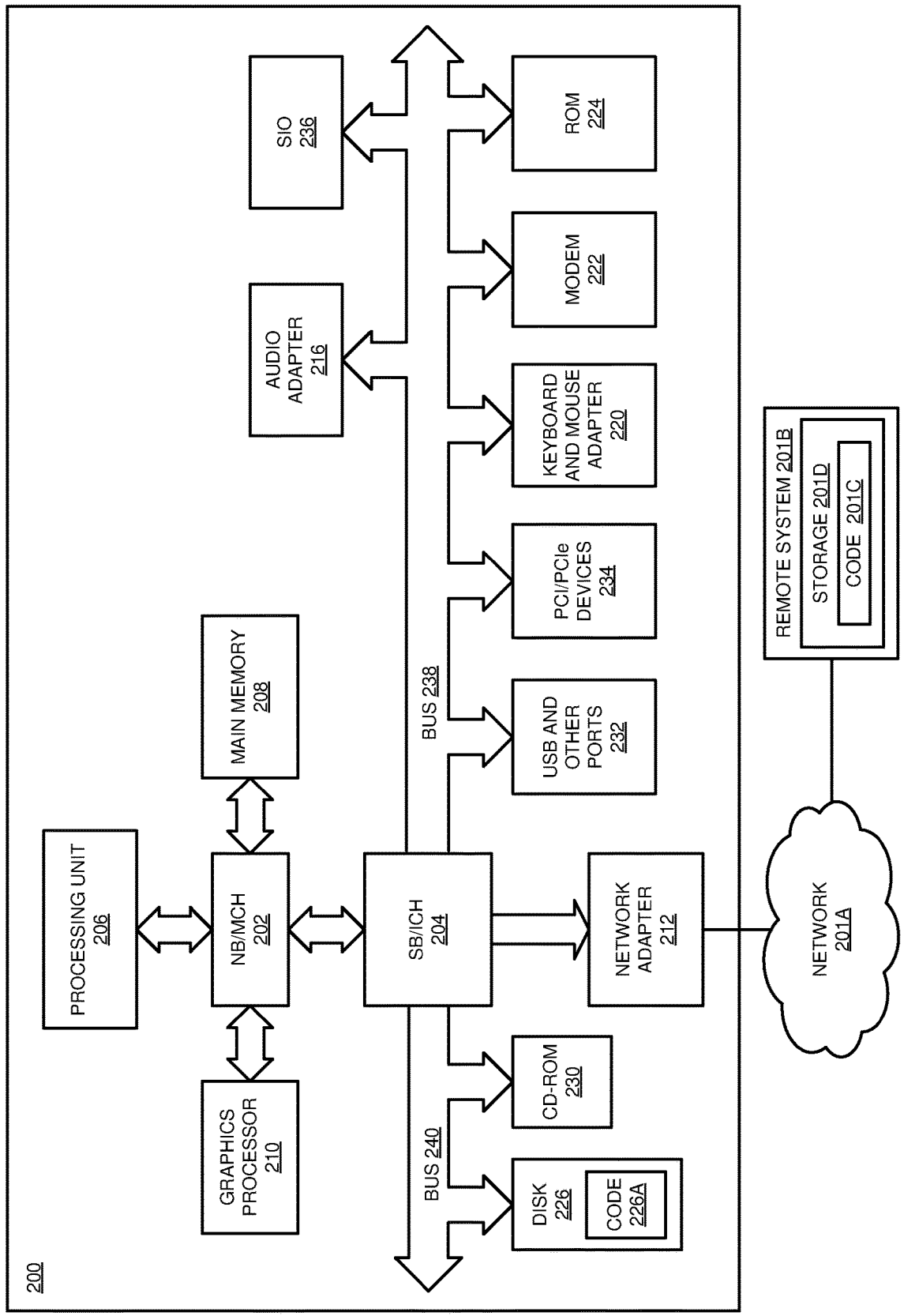
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
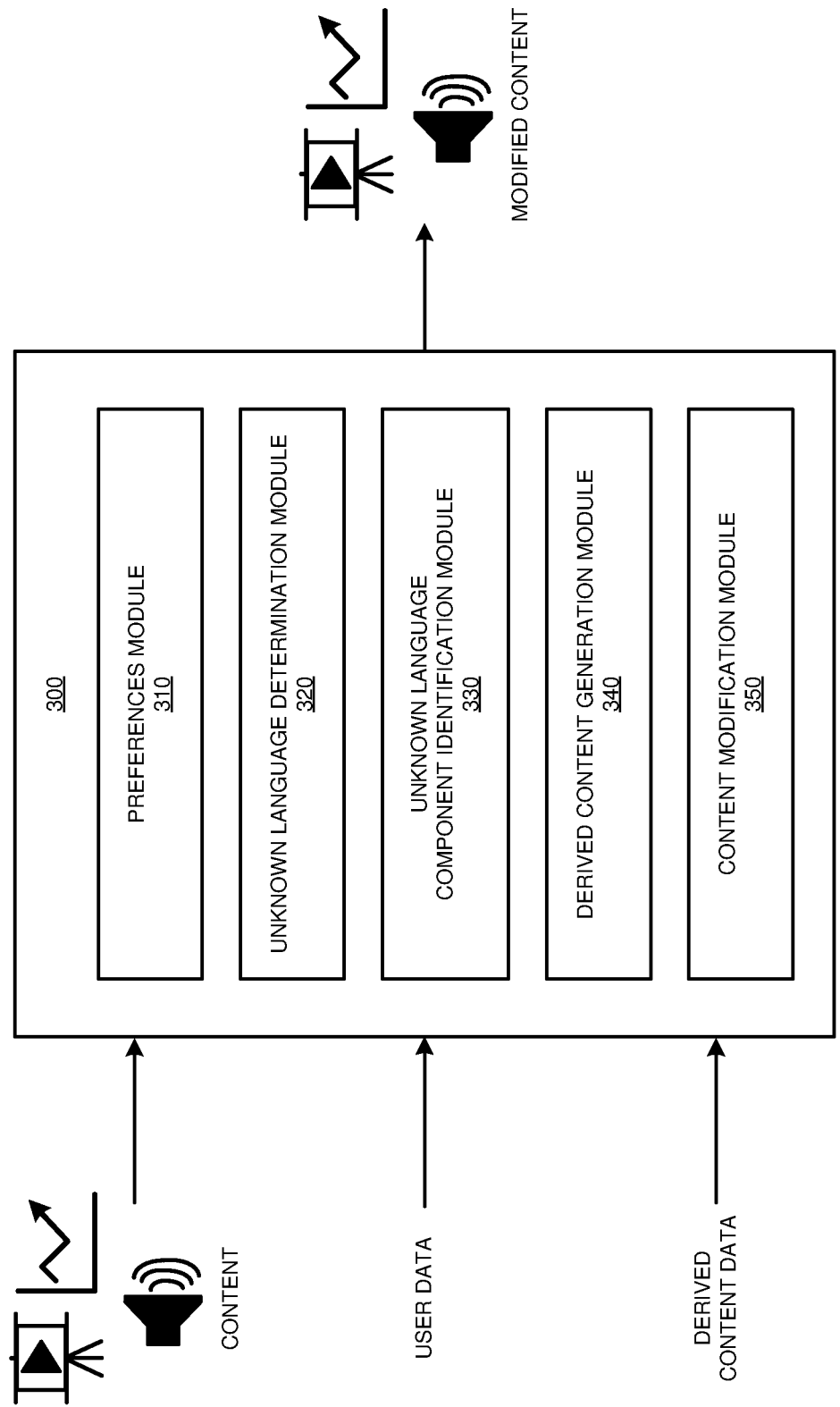
FIG. 3 depicts a block diagram of an example configuration for contextual and personalized real time content modification for language assistance in accordance with an illustrative embodiment.

With reference to FIG. 3, this figure depicts a block diagram of an example configuration for contextual and personalized real time content modification for language assistance in accordance with an illustrative embodiment. Application 300 is an example of application 105 in FIG. 1 and executes in any of servers 104 and 106, clients 110, 112, and 114, and device 132 in FIG. 1.

Preferences module 310 learns content language preferences of a user of the embodiment. In one implementation of module 310, a user supplies explicit content language preferences via a user interface. Another implementation of module 310 determines content language preferences of a user by analyzing content the user consumes. For example, if a user only consumes content in English, the embodiment infers that the user prefers content in English and not content in other languages. Another implementation of module 310 determines content language preferences of a user by using an IoT device. For example, a user might interact with an IoT device executing a voice-activated audio player application in French, and thus the embodiment infers that the user prefers content in French. Another implementation of module 310 determines content language preferences of a user by analyzing one or more of the user's textual messages, social media postings, inputs to websites, and other interactions with applications. One presently available technique for determining a language of written or spoken content is to use metadata explicitly describing the content's language. Another presently available technique for determining a language of written or spoken content is to use speech-to-text conversion (if necessary) and natural language processing on the resulting text to match words within content to a known language.

Unknown language determination module 320 detects a first language of the content, detects one or more users of the current content, detects a set of known languages for one or more detected users of the current content, and determines a set of unknown languages for one or more detected users of the current content, by removing the set of known languages from a set of languages the embodiment is able to process.

Unknown language component identification module 330 continues to use a presently available technique to analyze the content a user is currently consuming, detects that a subset or portion of the current content is in a different language from the first language of the content, and identifies the different language. Module 330 also determines whether the different language is in the set of known languages or the set of unknown languages. If the different language is in the set of known languages, module 330 continues to analyze the content for a later language change.

If the different language is in the set of unknown languages, derived content generation module 340 generates a modified subset from the original subset of content. The modified subset is expressed in the first language, not the different language. In one implementation of module 340, the modified subset is replacement content for the original subset. In another implementation of module 340, the modified subset is support content for the original subset. Another implementation of module 340 generates replacement content or support content, depending on a user's preference. One implementation of module 340 receives a user's preference explicitly, via a user interface. Another implementation of module 340 infers a user's preference, in a manner described herein, from other content generated by the user.

To generate a modified subset of content from the original subset of content, one implementation of module 340 uses an internal translation database matching words and phrases in one language with corresponding words and phrases in another language. Another implementation of module 340 searches, in real-time, a network such as the Internet for a translation or explanation of the original subset of content using a presently available cognitive tool, and evaluates a search result using a modified form of a presently known technique to search a corpus (such as documents available on the Internet) for content matching the original subset but in the desired language. Module 340 uses one or more quality measures to evaluate a result of the search, including: a language quality measure, measuring the proportion of a language (using the words of the language) within a sentence that is in multiple languages, and a user frustration based quality measure, measuring a user's frustration level with the content. Module 340 also uses a presently available technique to convert text to audio, if the modified content is to be presented in audio form.

Content modification module 350 inserts the modified subset of content into the original content, in near real time, while the user is viewing the content. If the modified subset of content is replacement content, module 350 replaces the original subset of content, in the unknown language, with replacement content. If the modified subset of content is support content, module 350 provides the support content along with the original content.

Figure 4:
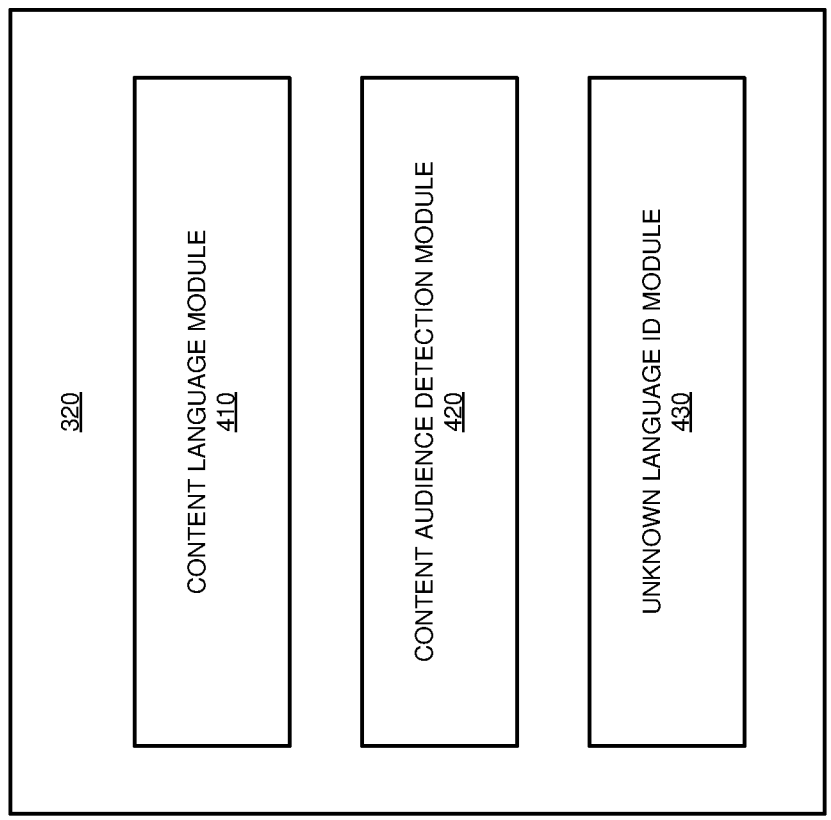
FIG. 4 depicts a block diagram of an example configuration for contextual and personalized real time content modification for language assistance in accordance with an illustrative embodiment.

With reference to FIG. 4, this figure depicts a block diagram of an example configuration for contextual and personalized real time content modification for language assistance in accordance with an illustrative embodiment. In particular, FIG. 4 provides more detail of unknown language determination module 320 in FIG. 3.

Content language module 410 uses a presently available technique to analyze a content a user is currently consuming and detect a first language of the content. The content may be live or prerecorded.

Content audience detection module 420 detects one or more users of the current content. In one implementation of module 420, a user notifies the embodiment that he or she is viewing the content, for example by logging into a user account with the embodiment. Another implementation of module 420 infers a presence of a user in a viewing location of the content. For example, some network-connected televisions include a subsystem capable of detecting the presence of a viewer in the vicinity of the television. As another example, a user might be concurrently interacting with a smart speaker device known to be installed in the vicinity of the user's viewing device. As a third example, a user might be consuming content on a device the user typically carries on her person, such as a smart\phone.

Module 420 determines a set of known languages for one or more detected users of the current content. One implementation of module 420 includes, in the set of known languages, any language of at least one detected user. For example, if there are two users present, and one prefers content in English while the other prefers content in English and French, the implementation includes both English and French in the set of known languages. Another implementation of module 420 includes, in the set of known languages, any language common to all detected users. Thus, for the same two example users, this implementation of module 420 includes only English in the set of known languages.

Unknown language identification module 430 determines a set of unknown languages for one or more detected users of the current content, by removing the set of known languages from a set of languages the embodiment is able to process. For example, if module 430 is able to process content in Japanese, Hindi, French, Spanish, and English, and the set of known languages contains English and French, the set of unknown languages is Japanese, Hindi, and Spanish.

Figure 5:
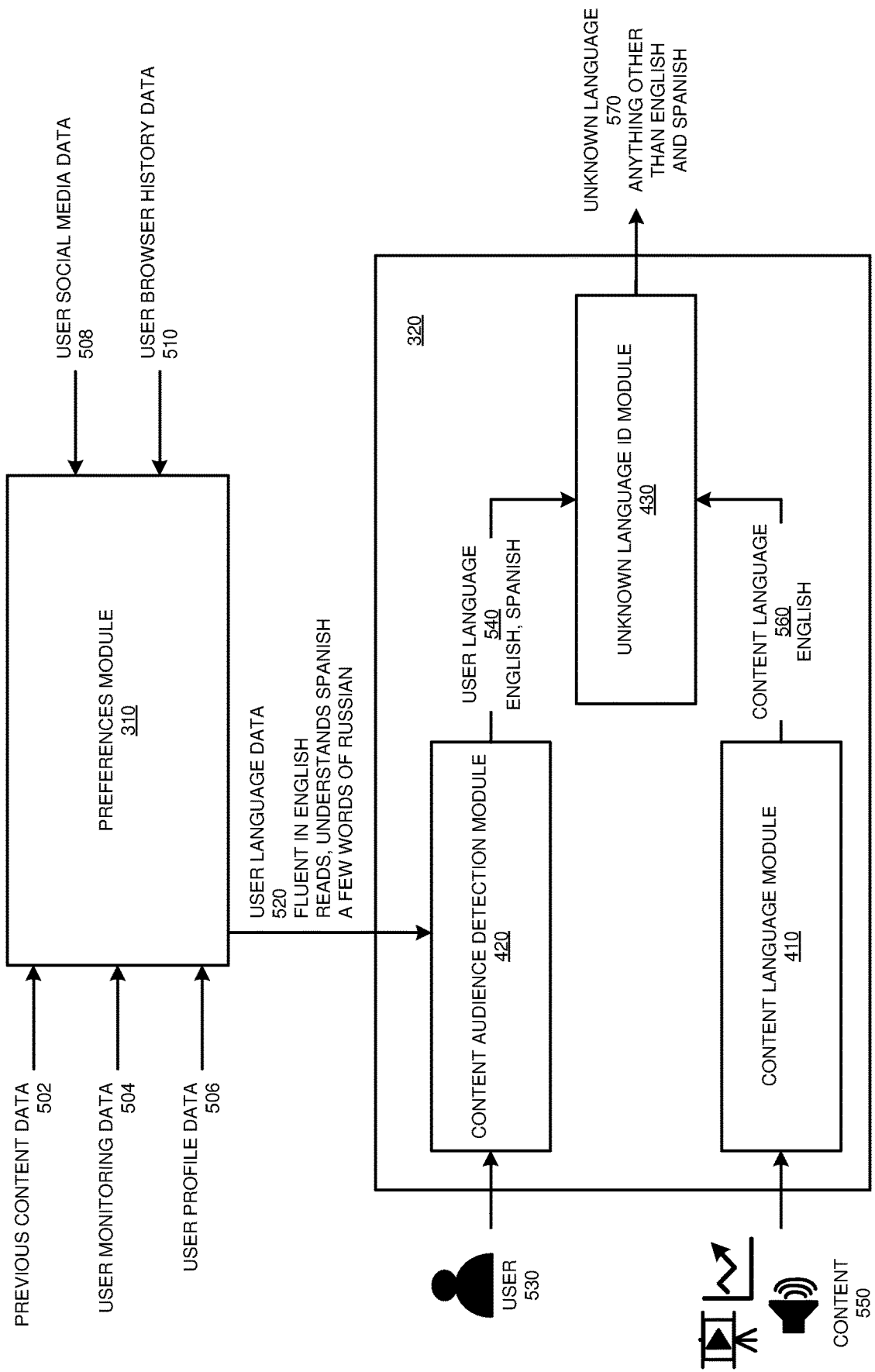
FIG. 5 depicts an example of contextual and personalized real time content modification for language assistance in accordance with an illustrative embodiment.

With reference to FIG. 5, this figure depicts an example of contextual and personalized real time content modification for language assistance in accordance with an illustrative embodiment. The example can be executed using application 300 in FIG. 3. Preferences module 310 and unknown language determination module 320 are the same as preferences module 310 and unknown language determination module 320 in FIG. 3. Content language module 410, content audience detection module 420, and unknown language identification module 430 are the same as content language module 410, content audience detection module 420, and unknown language identification module 430 in FIG. 4.

As depicted, preferences module 310 learns content language preferences of a user of the embodiment from content data 502, monitoring data 504, profile data 506, social media data 508, and history data 510. Content data 502 is data from content the user consumes, such as metadata explicitly describing the content's language or words within content module 310 can use to match with content in a known language. Monitoring data 504 is data obtained by using an IoT device, for example an IoT device executing a voice-activated audio player application. Profile data 506 is explicit content language preferences data a user supplies via a user interface. Social media data 508 is data of a user's textual messages and social media postings. History data 510 is data of a user's inputs to websites, and other interactions with applications. Module 310 produces user language data 520 for an example user, user 530.

Content language module 410 uses a presently available technique to analyze content 550, content user 530 is currently consuming. Module 410 detect content language 560: content 550 is in English. Content audience detection module 420 detects that user 530 is a user of content 550 and determines user language 540: English and Spanish. From user language 540 and content language 560, unknown language identification module 430 determines unknown language 570: languages other than English and Spanish.

Figure 6:
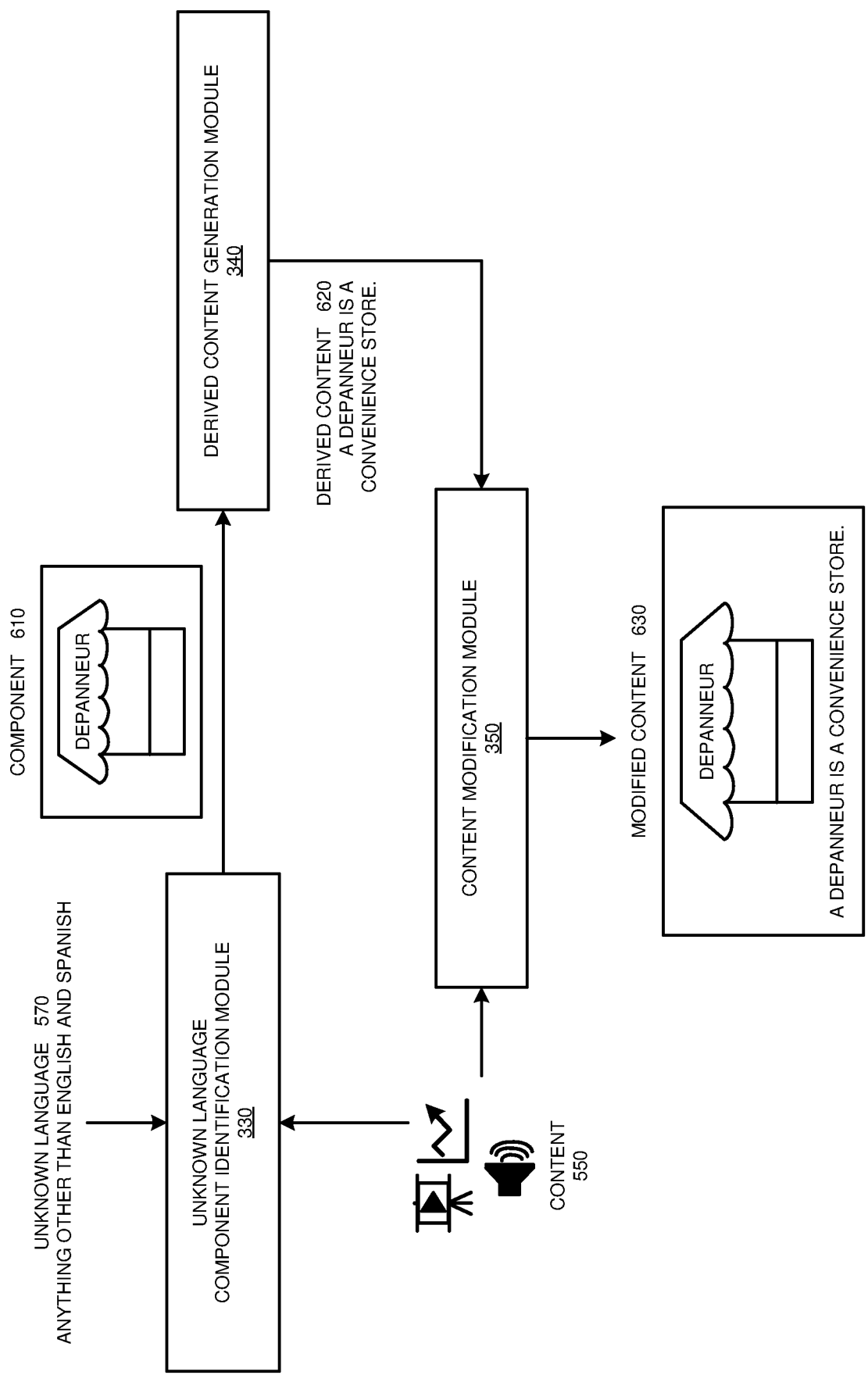
FIG. 6 depicts a continued example of contextual and personalized real time content modification for language assistance in accordance with an illustrative embodiment.

With reference to FIG. 6, this figure depicts a continued example of contextual and personalized real time content modification for language assistance in accordance with an illustrative embodiment. Unknown language component identification module 330, derived content generation module 340, and content modification module 350 are the same as unknown language component identification module 330, derived content generation module 340, and content modification module 350 in FIG. 3. Content 550 and unknown language 570 are the same as content 550 and unknown language 570.

As depicted, unknown language component identification module 330 continues to use a presently available technique to analyze content 550 and detects that component 610 is a subset or portion of content 550 is in French, not English. As a result, derived content generation module 340 generates derived content 620, a modification of component 610 that explains component 610 in English. Content modification module 350 inserts derived content 620 into content 550, generating modified content 630.

Figure 7:
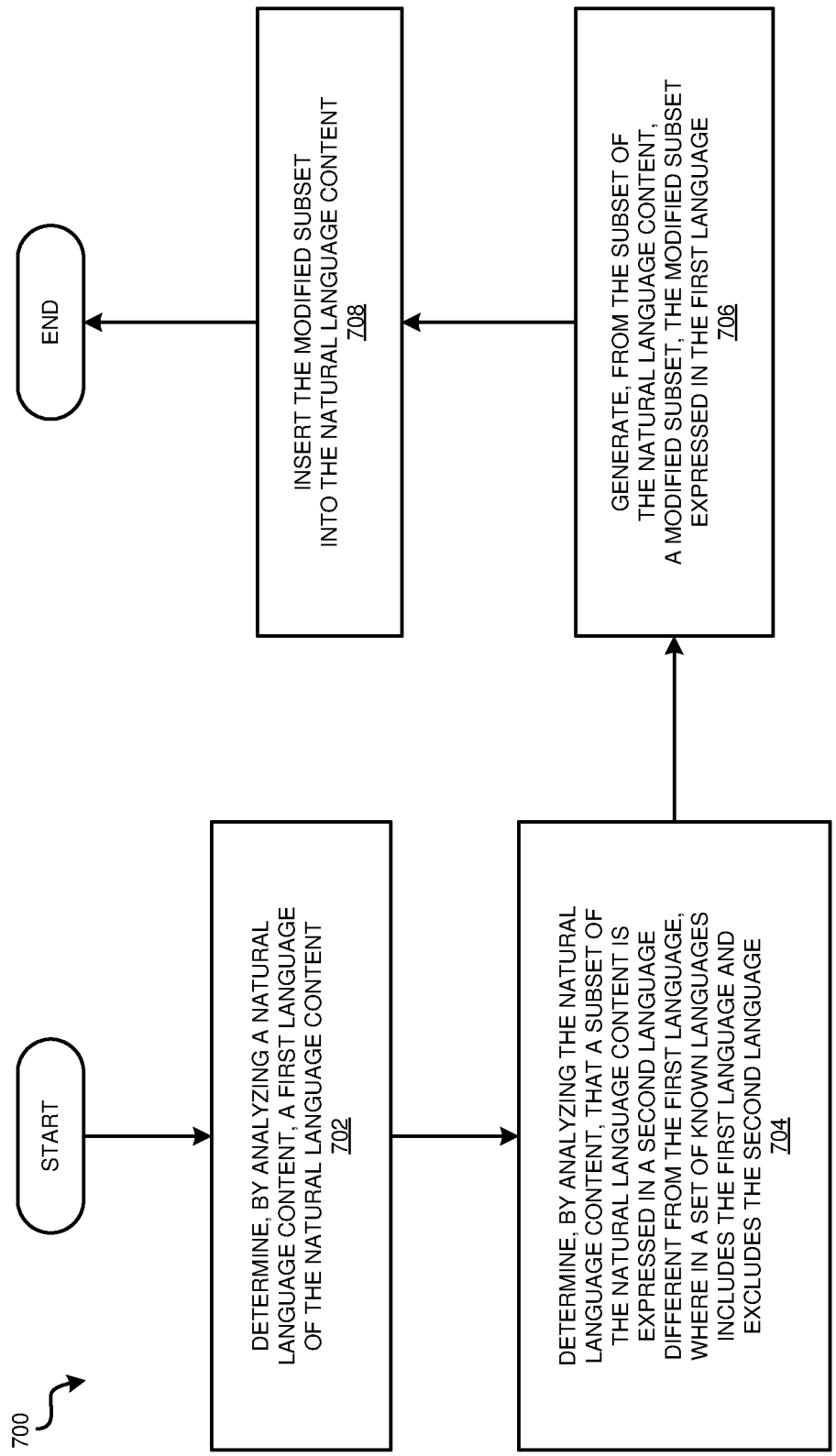
FIG. 7 depicts a flowchart of an example process for contextual and personalized real time content modification for language assistance in accordance with an illustrative embodiment.

With reference to FIG. 7, this figure depicts a flowchart of an example process for contextual and personalized real time content modification for language assistance in accordance with an illustrative embodiment. Process 700 can be implemented in application 300 in FIG. 3.

In block 702, the application determines, by analyzing a natural language content, a first language of the natural language content. In block 704, the application determines, by analyzing the natural language content, that a subset of the natural language content is expressed in a second language different from the first language, wherein a set of known languages includes the first language and excludes the second language. In block 706, the application generates, from the subset of the natural language content, a modified subset, the modified subset expressed in the first language. In block 708, the application inserts the modified subset into the natural language content. Then the application ends.

Figure 8:
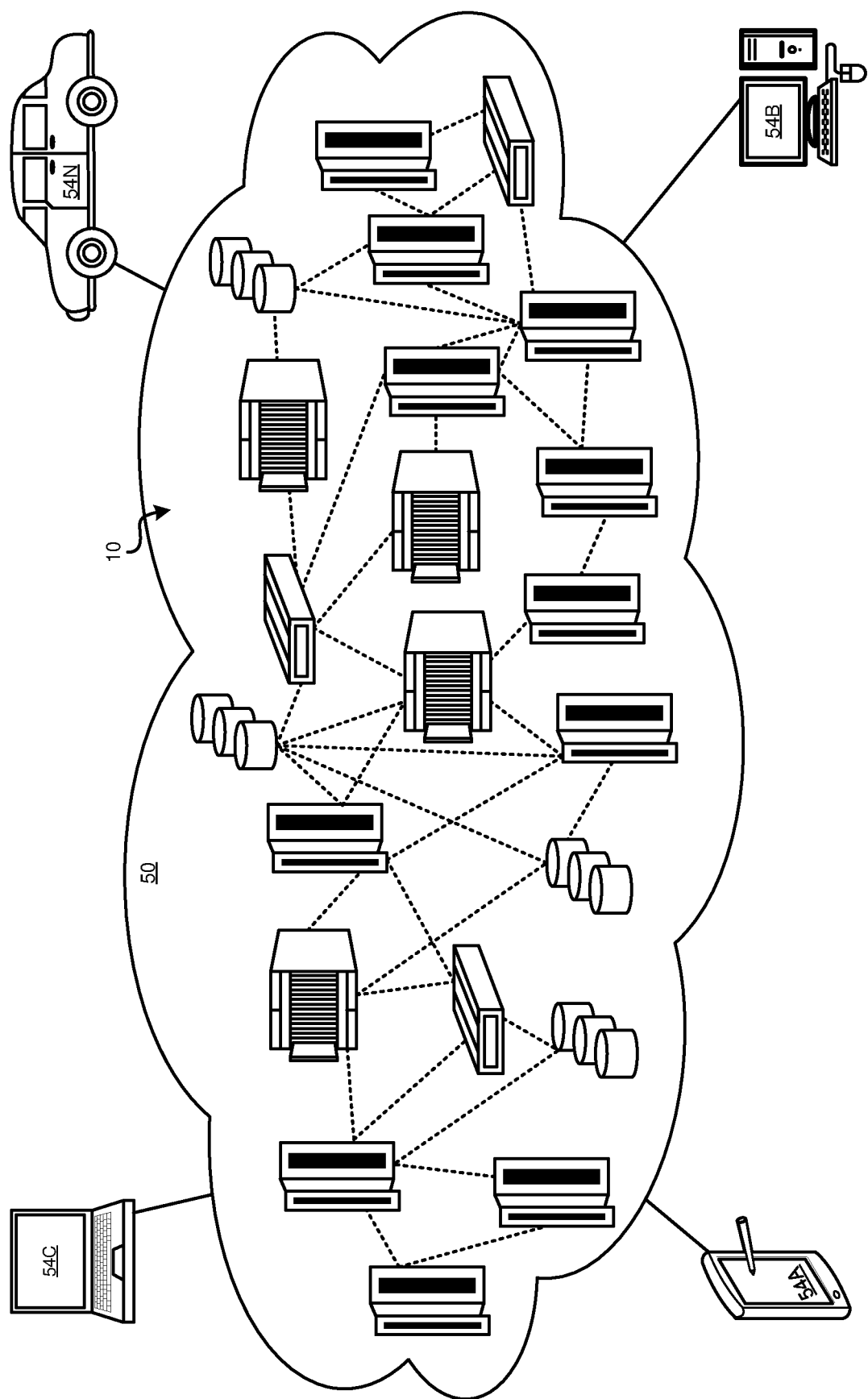
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N depicted are intended to be illustrative only and that computing nodes 10 and cloud computing environment 50 can communicate with any type of computerized device over any type of network and/or network addressable connection (e.g., using a web browser).

Figure 9:
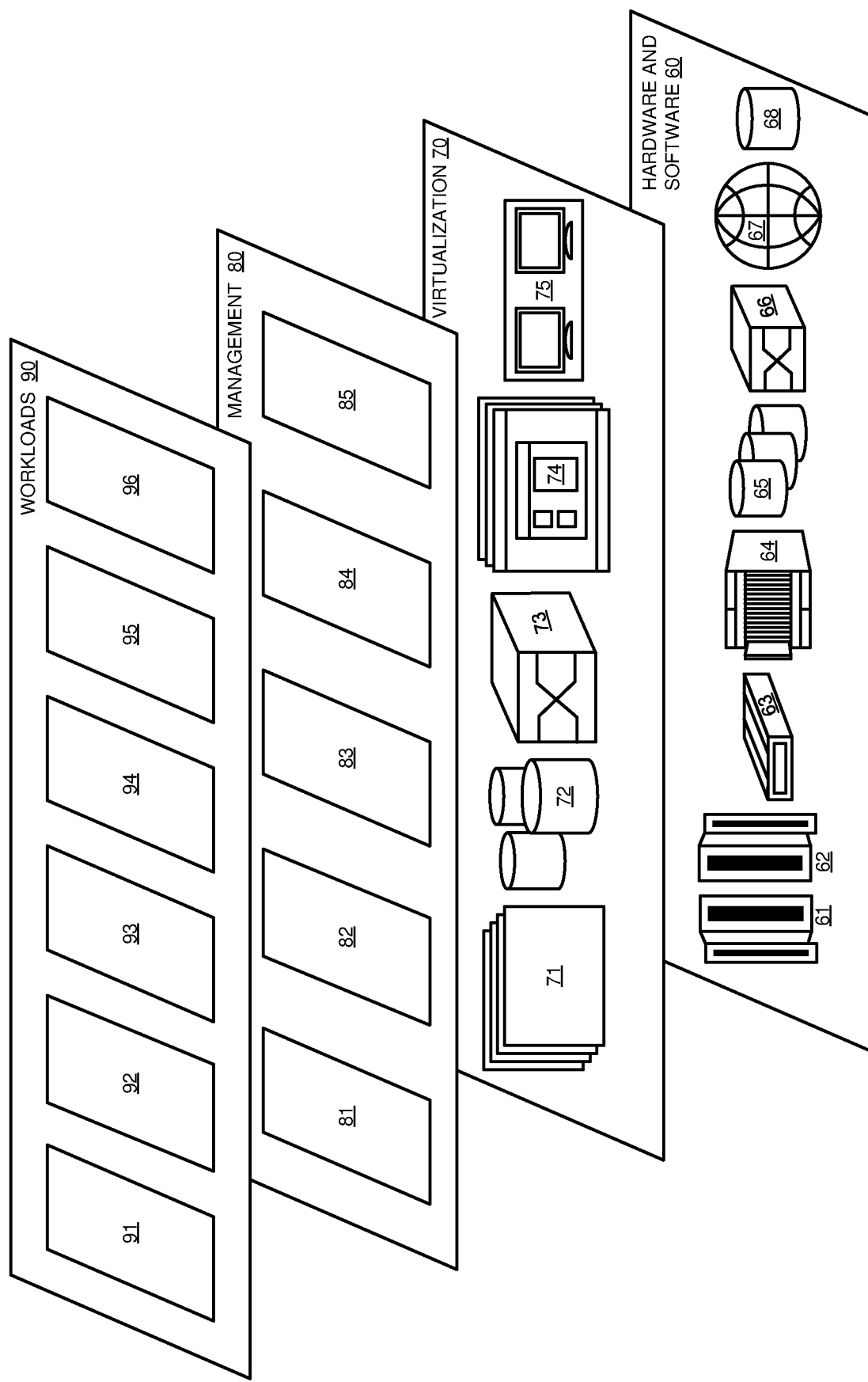
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions depicted are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for contextual and personalized real time content modification for language assistance and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    determining, responsive to monitoring an environment used by a first user and a second user, that a first interaction occurs in a first language between the first user relative to a first application in the environment, and a second interaction of the second user occurs using a combination of the first language and a second language in the environment;
    detecting, for a presentation of a natural language content occurring in a presentation application in the environment, that an audience comprises the first user and the second user;
    adding, responsive to the first language being common to the audience, the first language to a set of known languages and excluding the second language from the set of known languages;
    detecting, by analyzing the natural language content concurrently with the presentation of the natural language content, the first language of the natural language content, and that a subset of the natural language content is expressed in the second language;
    generating, from the subset of the natural language content, a modified subset, the modified subset expressed in the first language; and
    inserting, into the natural language content, the modified subset, the inserting resulting in a second natural language content.

2. The computer-implemented method of claim 1, wherein the set of known languages is specific to the first user.

3. The computer-implemented method of claim 2, further comprising:
    detecting, by analyzing a previously viewed natural language content in a content viewing history of the first user, a content language of the previously viewed natural language content; and
    adding, to the set of known languages, the content language.

4. The computer-implemented method of claim 2, further comprising:

monitoring, using a microphone installed in a device, an audio interaction of the first user with the first application executing on the device;

detecting, by analyzing the audio interaction, an interaction language of the audio interaction; and adding, to the set of known languages, the interaction language.

5. The computer-implemented method of claim 2, further comprising:

detecting, by analyzing a text interaction of the first user with the first application, an interaction language of the text interaction; and adding, to the set of known languages, the interaction language.

6. The computer-implemented method of claim 1, wherein the modified subset replaces the subset in the second natural language content.

7. The computer-implemented method of claim 1, wherein the subset and the modified subset are concurrently present in the second natural language content.

8. A computer program product for language assistance content modification, the computer program product comprising:

one or more computer readable storage media, and program instructions collectively stored on the one or more computer readable storage media, the stored program instructions when executed by a processor causing operations, the operations comprising:

determining, responsive to monitoring an environment used by a first user and a second user, that a first interaction occurs in a first language between the first user relative to a first application in the environment, and a second interaction of the second user occurs using a combination of the first language and a second language in the environment;

detecting, for a presentation of a natural language content occurring in a presentation application in the environment, that an audience comprises the first user and the second user;

adding, responsive to the first language being common to the audience, the first language to a set of known languages and excluding the second language from the set of known languages;

detecting, by analyzing the natural language content concurrently with the presentation of the natural language content, the first language of the natural language content, and that a subset of the natural language content is expressed in the second language;

generating, from the subset of the natural language content, a modified subset, the modified subset expressed in the first language; and inserting, into the natural language content, the modified subset, the inserting resulting in a second natural language content.

9. The computer program product of claim 8, wherein the set of known languages is specific to the first user.

10. The computer program product of claim 9, the operations further comprising:

detecting, by analyzing a previously viewed natural language content in a content viewing history of the first user, a content language of the previously viewed natural language content; and adding, to the set of known languages, the content language.

11. The computer program product of claim 9, the operations further comprising:

monitoring, using a microphone installed in a device, an audio interaction of the first user with the first application executing on the device;

detecting, by analyzing the audio interaction, an interaction language of the audio interaction; and adding, to the set of known languages, the interaction language.

12. The computer program product of claim 9, the operations further comprising:

detecting, by analyzing a text interaction of the first user with the first application, an interaction language of the text interaction; and adding, to the set of known languages, the interaction language.

13. The computer program product of claim 8, wherein the modified subset replaces the subset in the second natural language content.

14. The computer program product of claim 8, wherein the subset and the modified subset are concurrently present in the second natural language content.

15. The computer program product of claim 8, wherein the stored program instructions are stored in the at least one of the one or more storage media of a local data processing system, and wherein the stored program instructions are transferred over a network from a remote data processing system.

16. The computer program product of claim 8, wherein the stored program instructions are stored in the at least one of the one or more storage media of a server data processing system, and wherein the stored program instructions are downloaded over a network to a remote data processing system for use in a computer readable storage device associated with the remote data processing system.

17. The computer program product of claim 8, wherein the computer program product is provided as a service in a cloud environment.

18. A computer system comprising one or more processors, one or more computer-readable memories, and one or more computer-readable storage media, and program instructions stored on at least one of the one or more storage media for execution by at least one of the one or more processors via at least one of the one or more memories to cause operations, the operations comprising:

determining, responsive to monitoring an environment used by a first user and a second user, that a first interaction occurs in a first language between the first user relative to a first application in the environment, and a second interaction of the second user occurs using a combination of the first language and a second language in the environment;

detecting, for a presentation of a natural language content occurring in a presentation application in the environment, that an audience comprises the first user and the second user;

adding, responsive to the first language being common to the audience, the first language to a set of known languages and excluding the second language from the set of known languages;

detecting, by analyzing the natural language content concurrently with the presentation of the natural language content, the first language of the natural language content, and that a subset of the natural language content is expressed in the second language;

generating, from the subset of the natural language content, a modified subset, the modified subset expressed in the first language; and inserting, into the natural language content, the modified subset, the inserting resulting in a second natural language content.

19. The computer system of claim 18, wherein the set of known languages is specific to the first user.

20. The computer system of claim 19, the stored program instructions further comprising:
detecting, by analyzing a previously viewed natural language content in a content viewing history of the first user, a content language of the previously viewed natural language content; and
adding, to the set of known languages, the content language.

\* \* \* \* \*